United States Patent
Stephenson, Sr. et al.

(10) Patent No.: US 6,763,985 B1
(45) Date of Patent: Jul. 20, 2004

(54) TRUCK BED CARGO STABILIZER AND ORGANIZER APPARATUS

(76) Inventors: Newlyn Stephenson, Sr., 4940 W. 186th St., Country Club Hills, IL (US) 60478; George E. Brown, Jr., 507 E. 109$^{th}$ St., Chicago, IL (US) 60628

( * ) Notice: Subject to any disclaimer, the term of this patent is extended or adjusted under 35 U.S.C. 154(b) by 32 days.

(21) Appl. No.: 10/145,838

(22) Filed: May 13, 2002

Related U.S. Application Data

(63) Continuation-in-part of application No. 09/637,395, filed on Aug. 11, 2000, now abandoned.

(51) Int. Cl.$^7$ .............................................. B60R 7/02
(52) U.S. Cl. ...................... 224/403; 224/404; 224/539; 224/542; 296/37.6
(58) Field of Search ................................. 224/403, 404, 224/539, 540, 542, 543, 544, 567, 925; 296/37.6, 37.8, 39.1, 39.2; 211/71.01, 72, 73, 85.18, 85.21; 410/36, 42, 47; 206/564; 220/575

(56) References Cited

U.S. PATENT DOCUMENTS

| | | | | |
|---|---|---|---|---|
| 3,670,938 A | * | 6/1972 | Brocato | |
| 3,759,413 A | * | 9/1973 | Ardito | ........................ 206/564 |
| D250,224 S | * | 11/1978 | Bradley | |
| 4,754,883 A | * | 7/1988 | Grzywa | |
| 4,844,305 A | * | 7/1989 | McKneely | |
| 4,875,730 A | * | 10/1989 | Justice | |
| 4,887,947 A | * | 12/1989 | Bott | |
| 4,946,215 A | * | 8/1990 | Taylor | ........................ 224/542 |
| 5,167,433 A | * | 12/1992 | Ryan | |
| 5,167,434 A | * | 12/1992 | Bott | |
| 5,366,124 A | * | 11/1994 | Dearborn, IV | |
| 5,381,940 A | * | 1/1995 | Wright | ........................ 224/533 |
| D362,838 S | * | 10/1995 | Price | |
| 5,456,514 A | * | 10/1995 | Justice | |
| 5,526,972 A | * | 6/1996 | Frazier et al. | |
| 5,584,412 A | * | 12/1996 | Wang | ........................ 224/925 |
| 5,593,201 A | * | 1/1997 | Bateman | |
| 5,634,408 A | * | 6/1997 | Jarkowski | .................... 414/522 |
| 5,657,916 A | * | 8/1997 | Tackett | |
| 6,015,178 A | * | 1/2000 | Haack | |
| 6,022,062 A | * | 2/2000 | Fleenor | |
| 6,516,948 B1 | * | 2/2003 | Caballero | .................... 206/564 |

FOREIGN PATENT DOCUMENTS

FR      2669872 A1 * 6/1992     .................. 224/539

\* cited by examiner

*Primary Examiner*—Gary E. Elkins
(74) *Attorney, Agent, or Firm*—John D. Gugliotta; P. Jeff Martin

(57) ABSTRACT

A truck bed cargo stabilizer and organizer portable apparatus is provided for storing, stabilizing and organizing items placed in the bed of a pickup truck. The truck bed cargo stabilizer and organizer apparatus is comprised of a hollow structure for a bed of a truck having an upper portion and a lower portion forming a T-shape with a generally flat upper surface which includes a plurality of bucket receiving cylinders and a toolbox receiving cavity.

8 Claims, 3 Drawing Sheets

TRUCK BED CARGO STABILIZER AND ORGANIZER APPARATUS

RELATED APPLICATIONS

The present invention is a Continuation in Part of U.S. Ser. No. 09/637,395 filed on Aug. 11, 2000, now abandoned.

BACKGROUND OF THE INVENTION

1. Field of the Invention

The present invention relates generally to load container and stabilizer apparatuses for truck beds and, more particularly, to a truck bed cargo stabilizer and organizer apparatus.

2. Description of the Related Art

With sales at an all-time high, the popularity of the pick-up style truck as an everyday vehicle is more widespread than it ever has been. Their utility and convenience in hauling items coupled with the availability of luxury interiors and extended cab space have made the pickup a popular alternative to other vehicles. The availability of aftermarket accessories also enhances the attractiveness of pickup trucks as well. Perhaps one of the most common accessories is that of the bedliner, for protecting the metal surfaces of the pickup truck bed. While bedliners do an admirable job of protecting the bed, they do nothing to improve the functionality or organizational abilities of the pickup truck bed. Usually, tools, materials, and other similar items are simply tossed in and left to slide back and forth. When the time comes to retrieve such items, much time is wasted looking for the desired object.

A search of the prior art did not disclose any patents that read directly on the claims of the instant invention; however, the following references were considered related. The following patents disclose a truck bed load organizer apparatus: U.S. Pat. No. 5,526,972 issued in the name of Frazier et al.; U.S. Pat. No. 5,456,514 issued in the name of Justice; U.S. Pat. No. 5,366,124 issued in the name of Dearborn IV; U.S. Pat. No. 4,875,730 issued in the name of Justice; and U.S. Pat. No. 4,844,305 issued in the name of McKneely.

The following patents describe a cargo restraint system with a pair of recess members: U.S. Pat. No. 5,167,434 issued in the name of Bott; and U.S. Pat. No. 4,887,947 issued in the name of Bott.

U.S. Pat. No. 6,015,178 issued in the name of Haack discloses a truck bed liner with hingedly affixed divider.

U.S. Pat. No. 5,593,201 issued in the name of Bateman describes a truck tool organizer system including a bed cover.

Consequently, a need has been felt for providing a device which allows pickup truck users the ability to store tools, materials and other items in the bed of the pickup truck in an organized manner which is quick, easy and efficient to use.

SUMMARY OF THE INVENTION

Therefore, it is an object of the present invention to provide a truck bed cargo stabilizer and organizer apparatus being designed to securely hold a toolbox and five-gallon buckets in the bed of a pickup truck.

It is another object of the present invention to provide a device which holds multiple individual items securely in the bed of the pickup truck.

It is still another object of the present invention to provide a device which provides easy access to all items making them easier to find and saving the user time.

It is still another object of the present invention to provide a device which can fit all common types of pickup trucks.

Briefly described according to one embodiment of the present invention, a truck bed cargo stabilizer and organizer portable apparatus is provided for storing, stabilizing and organizing items placed in the bed of a pickup truck. The truck bed cargo stabilizer and organizer apparatus is comprised of a hollow structure for a bed of a truck having an upper portion and a lower portion forming a T-shape with a generally flat upper surface which includes a plurality of bucket receiving cylinders and a toolbox receiving cavity.

The T-shape of the present invention is designed and molded to accommodate the fender wells of a truck and for fitting other contours of a truck bed, including sidewalls, a cab wall, and a floor.

The truck bed cargo stabilizer and organizer apparatus is secured to a truck bed by suitable fasteners as is known in the art for securing bed liners to the bed of trucks.

Once disposed on the bed of a truck, the present invention has a longitudinal length extending from the cab wall to an end of the fender wells, leaving an area behind the end of the fender wells to an open tailgate for storing miscellaneous larger items.

The upper portion of the T-shaped hollow structure has a bucket receiving cylinder extending a vertical depth formed therein along an upper surface thereof.

The bucket receiving cylinder has a circular opening with a diameter such that a five-gallon paint bucket may be snugly received therein.

The upper portion further having an elongated, rectangular toolbox receiving cavity formed along an upper surface thereof opposite the bucket receiving cylinder for snugly receiving a toolbox therein.

The lower portion extends perpendicularly from the upper portion and is of a generally square, hollow configuration having a plurality of bucket receiving cylinders formed along an upper surface thereof. The bucket receiving cylinders of the lower portion are designed and configured identical to the bucket receiving cylinder of the upper portion. The lower portion comprises six bucket receiving cylinders formed along an upper surface thereof, aligned perpendicular with respect to the sidewalls of the truck bed, in two parallel oriented series which includes three receiving cylinders per series for snugly receiving five-gallon paint buckets.

The use of the present invention allows pickup truck users the ability to store tools, materials and other items in the bed of the truck in an organized manner which is quick, easy and efficient.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENT

1. Detailed Description of the Figures

Figure 1:
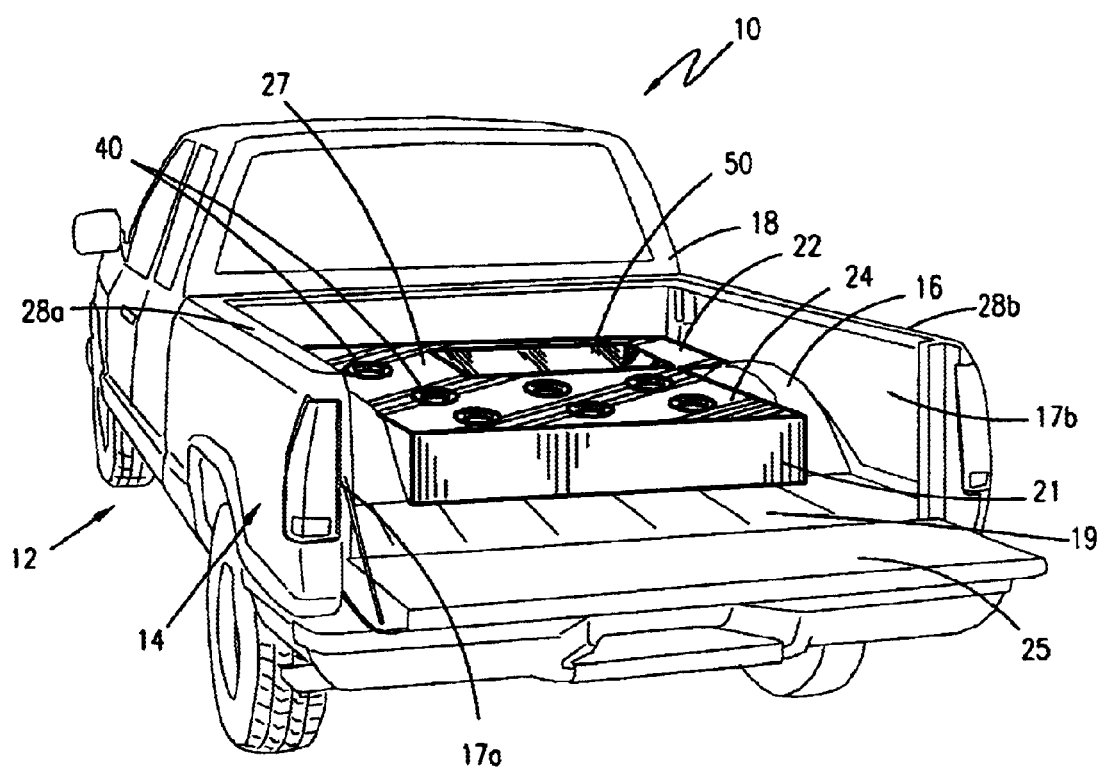
FIG. 1 is a perspective view of a truck bed cargo stabilizer and organizer apparatus according to the preferred embodiment of the present invention shown disposed on the bed of a pickup truck.
Figure 2:
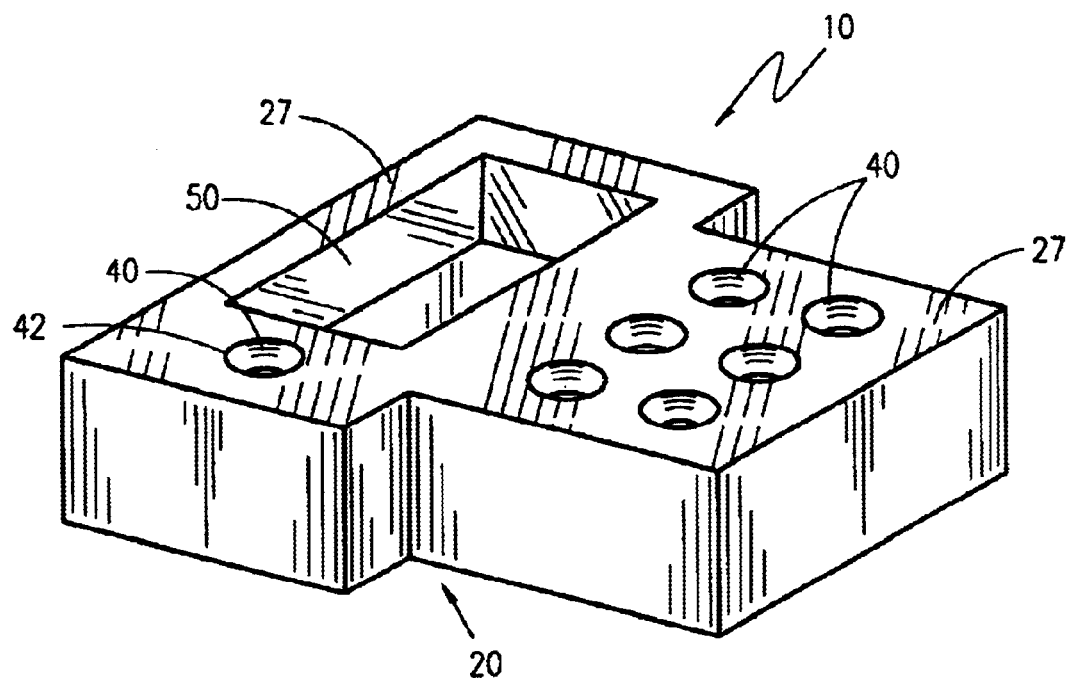
FIG. 2 is a perspective view from above of the truck bed cargo stabilizer and organizer apparatus according to the preferred embodiment of the present invention.
Figure 3:
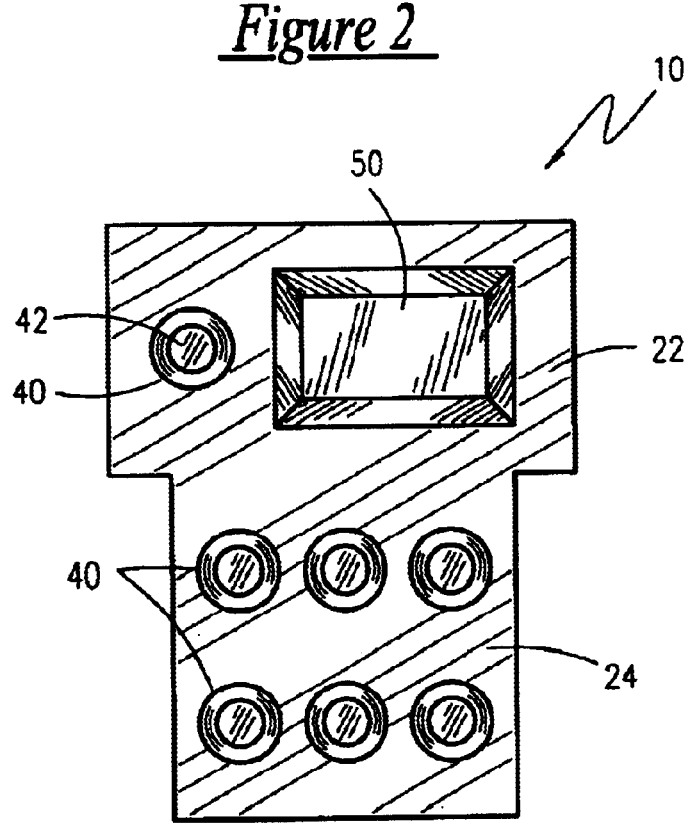
FIG. 3 is a top plan view thereof.

Referring now to FIGS. 1–3, a truck bed cargo stabilizer and organizer apparatus 10 is shown, according to the present invention, comprised of a T-shaped hollow structure 20 for a bed of a truck having an upper portion 22 and a lower portion 24 with a generally flat upper surface 27 which includes a plurality of bucket receiving cylinders 40 and a toolbox receiving cavity 50. For purposes of this disclosure, the T-shaped hollow structure 20 is defined as the upper portion 22 and lower portion 24 having downwardly depending sidewalls 21 with a flat bottom wall 23 defining an empty space between the upper and lower portions 22, 24, the sidewalls 21, and the bottom wall 23.

It is envisioned that various configurations of the truck bed cargo stabilizer and organizer apparatus 10 would be required so as to accommodate various truck beds 14 for different models of trucks 12.

The truck bed cargo stabilizer and organizer apparatus 10 is constructed of a lightweight, flexible, semi-rigid plastic material or other material capable of injection molding, and therefore can be formed easily of recycled material. The plastic material having durability characteristics of being resistant to frictional movement of heavy objects thereon and also being resistant to penetration by sharp corners of objects when moved thereon.

The T-shape of the present invention being designed and molded as such for accommodating the fender wells 16 of a truck 12 and for fitting other contours of a truck bed 14, including a first and second sidewall 17a, 17b, a cab wall 18, and a floor 19.

The truck bed cargo stabilizer and organizer apparatus 10 is secured to a truck bed 14 by suitable fasteners as is known in the art for securing bed liners to the bed 14 of trucks 12.

Once disposed on the bed 14 of a truck 12, the truck bed cargo stabilizer and organizer apparatus 10 has a longitudinal length extending from the cab wall 18 to an end 21 of the fender wells 16, thereby leaving an area behind the end 21 of the fender wells 16 to an open tailgate 25 for storing miscellaneous larger items. The truck bed cargo stabilizer and organizer apparatus 10 has a vertical length extending a distance from the floor 19 of the bed 14 such that an upper surface 27 of the truck bed cargo stabilizer and organizer apparatus 10 is in the same plane with respect to an upper surface 28a, 28b of each side wall 17a, 17b.

The upper portion 22 of the T-shaped hollow structure 20 is of an elongated, hollow, rectangular configuration having a bucket receiving cylinder 40 extending a vertical depth formed therein along an upper surface 27 at an end thereof.

The bucket receiving cylinder 40 having a circular opening 42 with a diameter such that a five-gallon paint bucket 43 may be snugly received therein, thereby performing a function of stabilizing the bucket 43 and preventing shifting thereof.

Figure 4A:
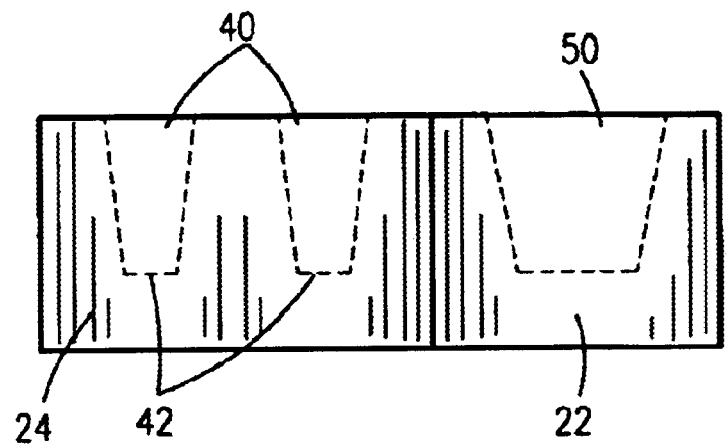
FIG. 4a is a left side view thereof.
Figure 4B:
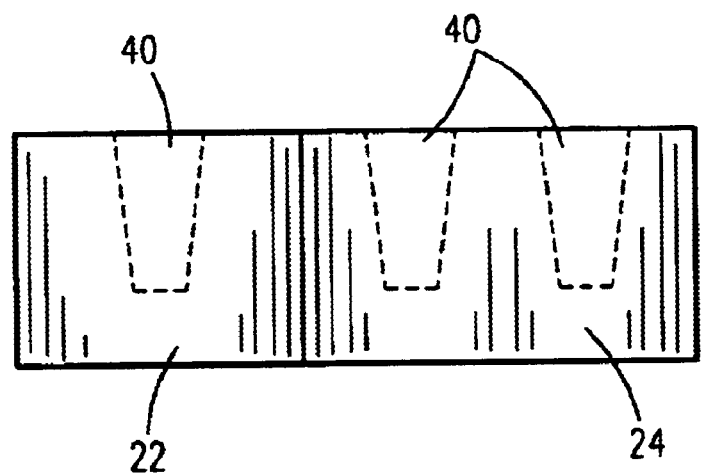
FIG. 4b is a right side view thereof.

Referring now to FIGS. 4a and 4b, the bucket receiving cylinder 40 further having a depth dimension such that a vertical length of an inserted bucket 43 extends just short the depth of the receiving cylinder 40. The bucket receiving cylinder 40 converges slightly with increased distance from the opening 42 to a bottom thereof, thereby allowing for both ease of ingress and egress of the bucket 43 while also providing for a snug fit which stabilizes the bucket 43.

The upper portion 22 is further defined as having an elongated, rectangular toolbox receiving cavity 50 formed along an upper surface 27 thereof opposite the bucket receiving cylinder 40.

The depth dimension and perimeter measurements of the toolbox receiving cavity 50 is such that a toolbox may be snugly received therein, thereby stabilizing the toolbox and preventing shifting thereof. The perimeter measurements of the toolbox receiving cavity 50 extend uniformly through the depth of the toolbox receiving cavity 50.

Referring now to FIGS. 2–4b, the lower portion 24, extending perpendicularly from the upper portion 22 of the T-shaped hollow structure 20, is of a generally square, hollow configuration having a plurality of bucket receiving cylinders 40 formed along an upper surface 27 thereof. The bucket receiving cylinders 40 of the lower portion 24 being designed and configured identical to the bucket receiving cylinder 40 of the upper portion 33. The lower portion 24 is envisioned as having six bucket receiving cylinders 40 formed along an upper surface thereof 27, aligned perpendicular with respect to the sidewalls 17a, 17b of the truck bed 14, in two parallel oriented series which includes three receiving cylinders 40 per series for snugly receiving five-gallon paint buckets 43.

It is envisioned that the bucket receiving cylinders 40 have a diameter measuring approximately 11 inches.

2. Operation of the Preferred Embodiment

To use the present invention, after the truck bed cargo stabilizer and organizer apparatus has been disposed on the bed 14 of a truck 12, a user can simply place a tool box in the tool box receiving cavity 50 and place five gallon paint buckets in the bucket receiving cylinders 40 where they are snugly and securely held in place. The tool box and the paint buckets will not only be stabilized so as to prevent any shifting thereof, but will also be secured in an organized manner, thereby providing a means for quickly locating these items when needed.

Both the tool box receiving cavity 50 and the bucket receiving cylinders 40 can also be used for securely storing and organizing other tools and items including but not limited to ropes, chains, paint brushes and jumper cables.

Being designed so as to leave an area behind the end 21 of the fender wells 16 to an open tailgate 25, the present invention allows the user to then store miscellaneous larger items therein.

The use of the present invention allows pickup truck 12 users the ability to store tools, materials and other items in the bed 14 of a truck 12 in an organized manner which is quick, easy and efficient.

Therefore, the foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. Therefore, the scope of the invention is to be broadly limited only by the following claims.

What is claimed is:

1. A truck bed cargo stabilizer and organizer apparatus comprising:
   a T-shaped hollow structure having an upper portion and a lower portion with a generally flat upper surface which includes a plurality of bucket receiving cylinders and a toolbox receiving cavity, wherein said upper portion of the T-shaped hollow structure is of an elongated, hollow, rectangular configuration forming a bucket receiving cylinder extending a vertical depth formed therein along an upper surface at an end thereof:

wherein said bucket receiving cylinder further has a depth dimension such that a vertical length of an inserted bucket extends just short the depth of the receiving cylinder.

2. The truck bed cargo stabilizer and organizer apparatus of claim 1, wherein said bucket receiving cylinder converges slightly with increased distance from the opening to a bottom thereof, thereby allowing for both ease of ingress and egress of the bucket while also providing for a snug fit which stabilizes the bucket.

3. The truck bed cargo stabilizer and organizer apparatus of claim 2, wherein said upper portion is further defined as having an elongated, rectangular toolbox receiving cavity formed along an upper surface opposite the bucket receiving cylinder.

4. The truck bed cargo stabilizer and organizer apparatus of claim 3, wherein a lower portion, extending perpendicularly from the upper portion of the T-shaped hollow structure, is of a generally square, hollow configuration having a plurality of bucket receiving cylinders formed along an upper surface.

5. The truck bed cargo stabilizer and organizer apparatus of claim 4, wherein said bucket receiving cylinders of the lower portion are designed and configured identical to the bucket receiving cylinder of the upper portion.

6. The truck bed cargo stabilizer and organizer apparatus of claim 1, wherein the T-shaped hollow structure is constructed of a lightweight, flexible, semi-rigid plastic material.

7. The truck bed cargo stabilizer and organizer apparatus of claim 1, wherein the T-shape of the present invention being designed and molded as such for accommodating the fender wells of a truck and for fitting other contours of a truck bed, including a first and second sidewall, a cab wall, and a floor.

8. The truck bed cargo stabilizer and organizer apparatus of claim 1, wherein said T-shaped hollow structure is secured to a truck bed by suitable fasteners.

* * * * *